(12) United States Patent
Kiyota

(10) Patent No.: US 6,426,494 B1
(45) Date of Patent: Jul. 30, 2002

(54) OPTICAL SIGNAL DETECTOR AND OPTICAL SIGNAL DETECTING METHOD

(75) Inventor: Toshiya Kiyota, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/477,586

(22) Filed: Jan. 4, 2000

(30) Foreign Application Priority Data

Jan. 7, 1999 (JP) .......................................... 11-002144

(51) Int. Cl.$^7$ ................................................ H01J 40/14
(52) U.S. Cl. ............................. 250/214 R; 250/214 A; 330/308
(58) Field of Search ..................... 250/214 R, 214 A, 250/214 LA, 214 AG, 214 C, 201.5; 330/59, 110, 259, 290, 300; 327/514, 515; 369/44.32, 44.41

(56) References Cited

U.S. PATENT DOCUMENTS 5,574,714 A * 11/1996 Masashi et al. ............. 330/254

FOREIGN PATENT DOCUMENTS

| EP | 0654785 | 5/1995 | ............ G11B/7/09 |
| JP | 61-58042 | 7/1986 | ............ G11B/7/09 |
| JP | 63-74842 | 5/1988 | ............ H04B/9/00 |
| JP | 2-271223 | 11/1990 | ............ G01J/3/50 |
| JP | 5-60870 | 3/1993 | ............ G01T/1/20 |
| JP | 07-253390 | 10/1995 | ........... G01N/15/14 |
| JP | 07-282458 | 10/1995 | ............ G11B/7/09 |

* cited by examiner

Primary Examiner—Kevin Pyo
(74) Attorney, Agent, or Firm—Hayes Soloway P.C.

(57) ABSTRACT

An optical signal and an optical signal detecting method in which the difference between the outputs of a first photodetector and a second photodetector is taken to generate a differential signal by differential output mean. The photoelectric conversion efficiency of the second photodetector is varied in accordance with the difference in photoelectric conversion efficiency between the first and second photodetectors by a control device.

4 Claims, 3 Drawing Sheets

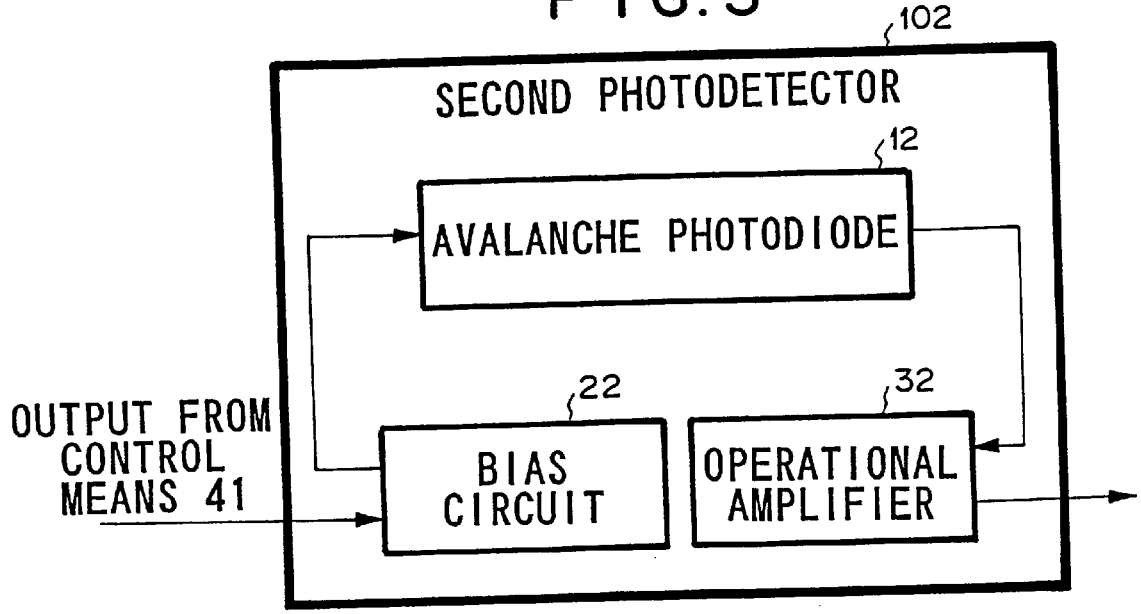
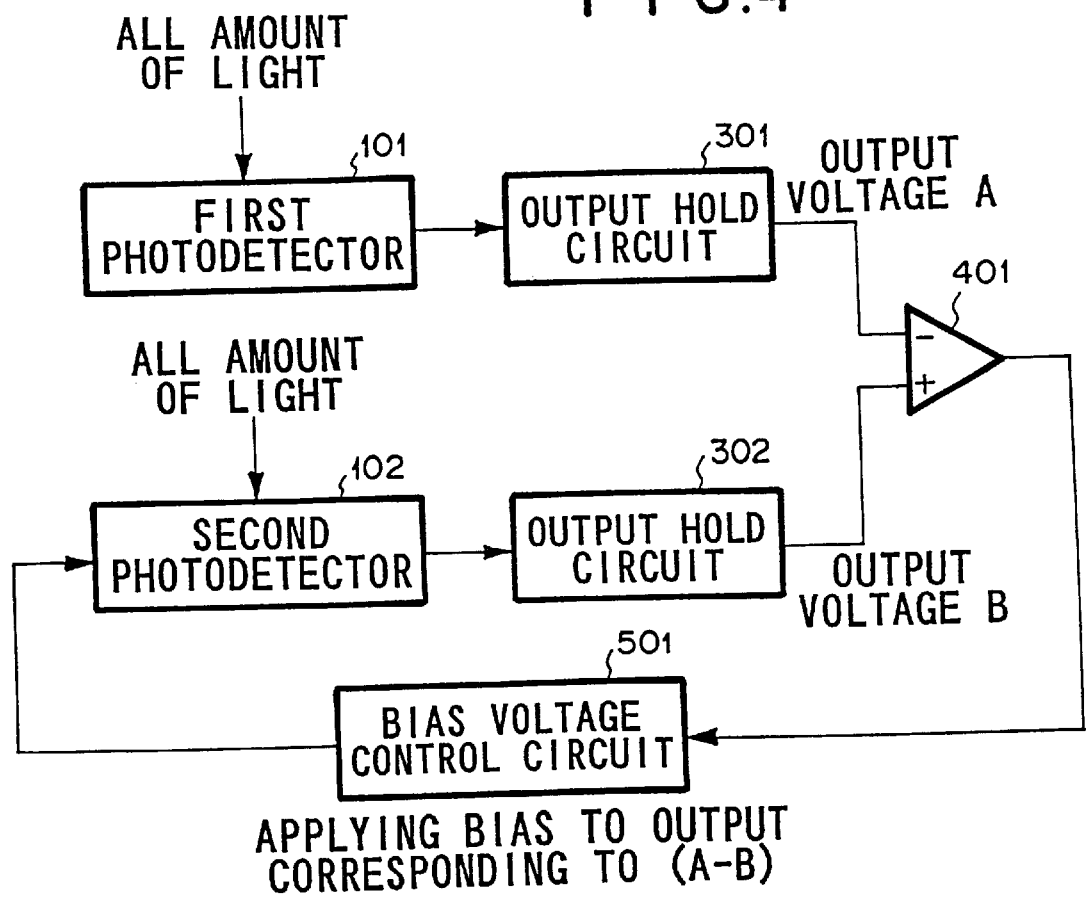

OPTICAL SIGNAL DETECTOR AND OPTICAL SIGNAL DETECTING METHOD

BACKGROUND OF THE INVENTION

1. Field of the Invention

The present invention relates to an optical signal detector and an optical signal detecting method and particularly, to an optical signal detector which has two or more photodetectors and a function of calculating the difference between the outputs of two of these photodetectors to output a differential signal, and an optical signal detecting method for the optical signal detector.

2. Description of Related Art

In an optical signal detector having two or more photodetectors, when the difference between the output signals of two of these photodetectors is taken to create a differential signal, the relationship between the incident light and electrical output of the two photodetectors, that is, the photoelectric conversion efficiency is required to be relatively constant between the two photodetectors.

However, in order to make the photoelectric conversion efficiency uniform between the photodetectors, the photodetectors available are limited to only photodetectors which have relatively low photoelectric conversion efficiency and uniform characteristic. Therefore, the photoelectric conversion efficiency cannot be enhanced by the optical signal detector for producing the differential signal.

On the other hand, a photoelectric conversion element such as an avalanche photodiode having a high photoelectric conversion efficiency may be used to implement an optical signal detector having a high photoelectric conversion efficiency. However, the avalanche photodiode has a large dispersion in photoelectric conversion efficiency between elements, and thus it is unsuitable for producing the differential signal. Therefore, it has been difficult to implement a differential signal detector having a high photoelectric conversion efficiency.

The following publications are related to the present invention: Japanese Laid-open Patent Publication No. 61-158042 discloses that DC offset between first photodetecting means and second photodetecting means is detected and then supplied to an input of an operational amplifier, and Japanese Laid-open Patent Publication No. 7-282458 discloses that the gain of the amplifier that the first photodetection output from a first photodetecting element is amplified is controlled and consequently, the balance between the first photodetection output and the second photodetection output from a second photodetecting element can be controlled to an optimum state.

SUMMARY OF THE INVENTION

An object of the present invention is to provide an optical signal detector and an optical signal detecting method which can produce a differential signal with no dispersion in differential detection and with high photoelectric conversion efficiency.

In order to attain the above object, according to a first aspect of the present invention, an optical signal detector which comprises a first photodetector, a second photodetector, differential output means for taking the difference between the outputs of said first and second photodetectors and outputting a differential signal, and control means which detect the difference in photoelectric conversion efficiency between said first and second photodetectors on the basis of the outputs of said first and second photodetectors and vary the photoelectric conversion efficiency of said second photodetector in accordance with said difference in the photoelectric conversion efficiency.

In order to attain the above object, according to a second aspect of the present invention, an optical signal detecting method for taking the difference between the outputs of a first photodetector and a second photodetector and outputting a differential signal, which comprises detecting the difference in photoelectric conversion efficiency between said first and second photodetectors on the basis of the outputs of said first and second photodetectors, and varying the photoelectric conversion efficiency of said second photodetector in accordance with said difference in the photoelectric conversion efficiency.

According to the present invention, even when photodetectors such as avalanche photodiodes which are difficult to be uniform in photoelectric conversion efficiency are used, the outputs of the two photodetectors needed to produce a differential signal are compared with each other to detect the difference in photoelectric conversion efficiency between the first photodetector and the second photodetector, and for example a bias voltage is applied to the second photodetector in accordance with the difference of the photoelectric conversion efficiency so that the two photodetectors apparently have the same photoelectric conversion efficient, thereby enhancing the detection precision of the differential signal. Accordingly, there can be implemented a differential signal detecting device using avalanche photodiodes having high photoelectric conversion efficiency or the like.

BRIEF DESCRIPTION OF THE DRAWINGS

FIG. 3 is a diagram showing a second photodetector;

FIG. 4 is a diagram showing a detection method of the photoelectric conversion efficiency of an avalanche photodiode.

DETAILED DESCRIPTION OF THE PREFERRED EMBODIMENT

A preferred embodiment according to the present invention will be described hereunder with reference to the accompanying drawings.

Figure 1:
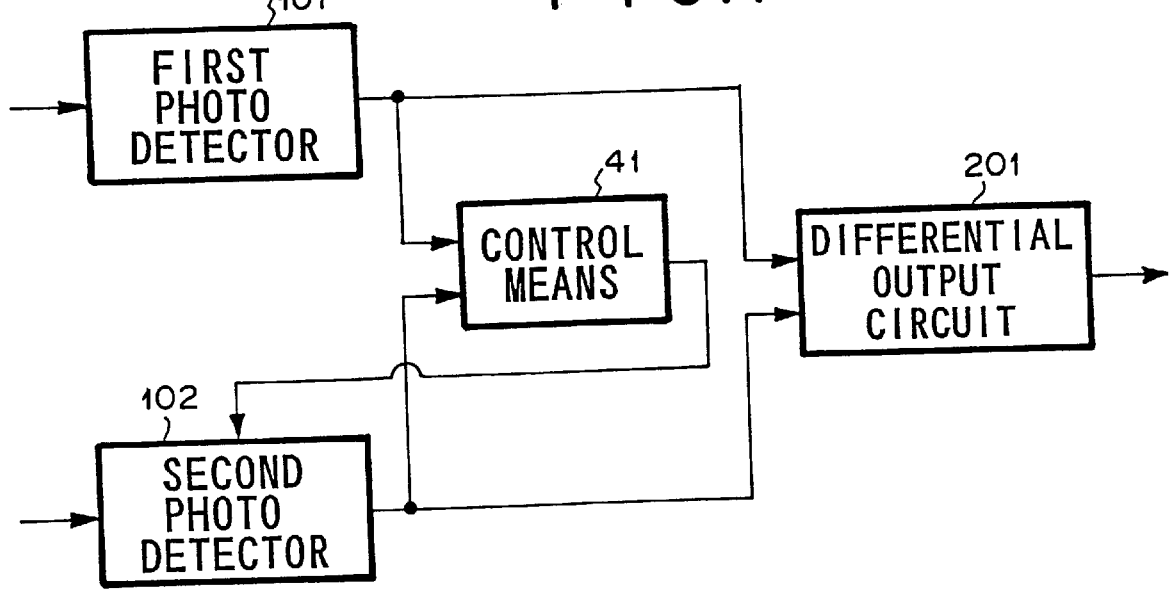
FIG. 1 is a diagram showing an embodiment of an optical signal detector according to the present invention.
Figure 2:
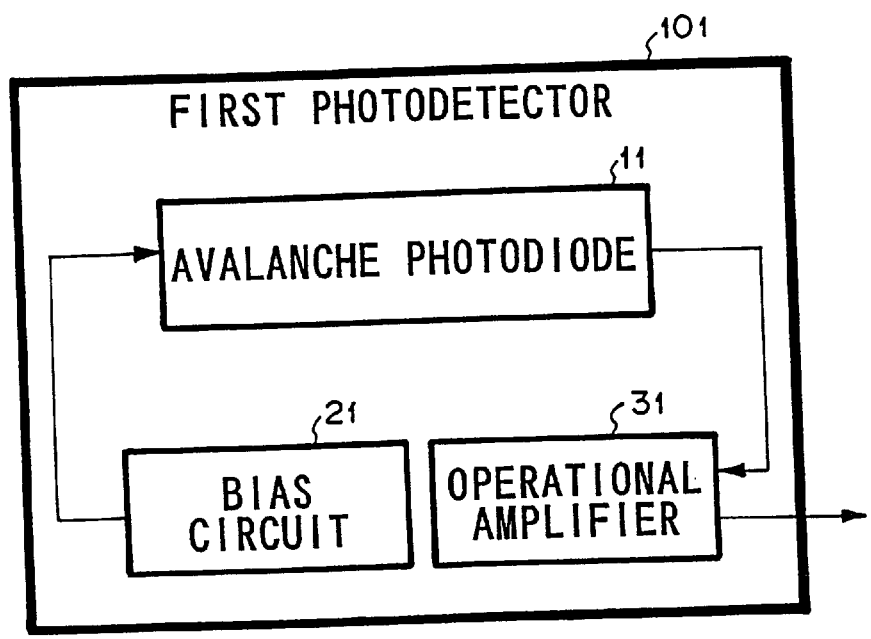
FIG. 2 is a diagram showing a first photodetector.

FIG. 1 is a diagram showing an embodiment of an optical signal detector according to the present invention, FIG. 2 is a diagram showing a first photodetector and FIG. 3 is a diagram showing a second photodetector.

As shown in FIG. 2, a first photodetector 101 includes avalanche photodiode 11 having a high photoelectric conversion efficiency, bias circuit 21 for applying a constant bias voltage to the avalanche photodiode 11, and operational amplifier 31 for converting the output current from the avalanche photodiode 11 to a voltage.

As shown in FIG. 3, second photodetector 102 includes avalanche photodiode 12, bias circuit 22 for applying a bias voltage which varies in accordance with the output of control means 41, and operational amplifier 32 for converting the output current from the avalanche photodiode 12 to a voltage.

As shown in FIG. 1, the output of the first photodetector 101 and the output of the second photodetector 102 are input to differential output circuit 201 and then output as a differential signal output. Further, the output of the first photodetector 101 and second photodetector 102 are input to the control means 41, and the control means 41 generates a control output which varies the bias voltage to the second photodetector 102 so that the photoelectric conversion efficiency in a specific frequency area is equal between the first photodetector 101 and the second photodetector 102.

As a result, the first photodetector 101 and the second photodetector 102 have the same photoelectric conversion efficiency, so that an accurate differential signal is output from differential output circuit 201. Therefore, there can be implemented an optical signal detector which has a high photoelectric conversion efficiency and outputs an accurate differential signal.

FIG. 4 is a block diagram showing a detection method of the photoelectric conversion efficiency of the avalanche photodiodes 11 and 12.

In the following description, the present invention is applied to an optical disc device. In the case of the optical disc device, the differential detection is carried out for the purpose of making one beam (light flux) irradiated equally to each of the first and second photodetectors 101 and 102.

In order to detect the photoelectric conversion efficiency of the first and second photodetectors 101 and 102 and compare those photoelectric conversion efficiency, all amount of light is first irradiated to the first photodetector 101 and the output voltage A of the first photodetector 101 thus obtained is held in output holding circuit 301. Thereafter, all amount of light is irradiated to the second photodetector 102, and the output voltage B of the second photodetector 102 thus obtained is held in output holding circuit 302. The difference between the output voltage A and the output voltage B is detected by differential amplifier 401. If the differential voltage (A-B) is not equal to zero, the bias voltage of the photodetector 102 is varied in accordance with the differential voltage (A-B) by bias voltage control circuit 501, and the output voltage B of the photodetector 102 is set to output voltage B which is equal to the output voltage A. Therefore, the photoelectric conversion efficiency of the photodetectors 101 and 102 can be matched (coincident) with each other.

Figure 5A:
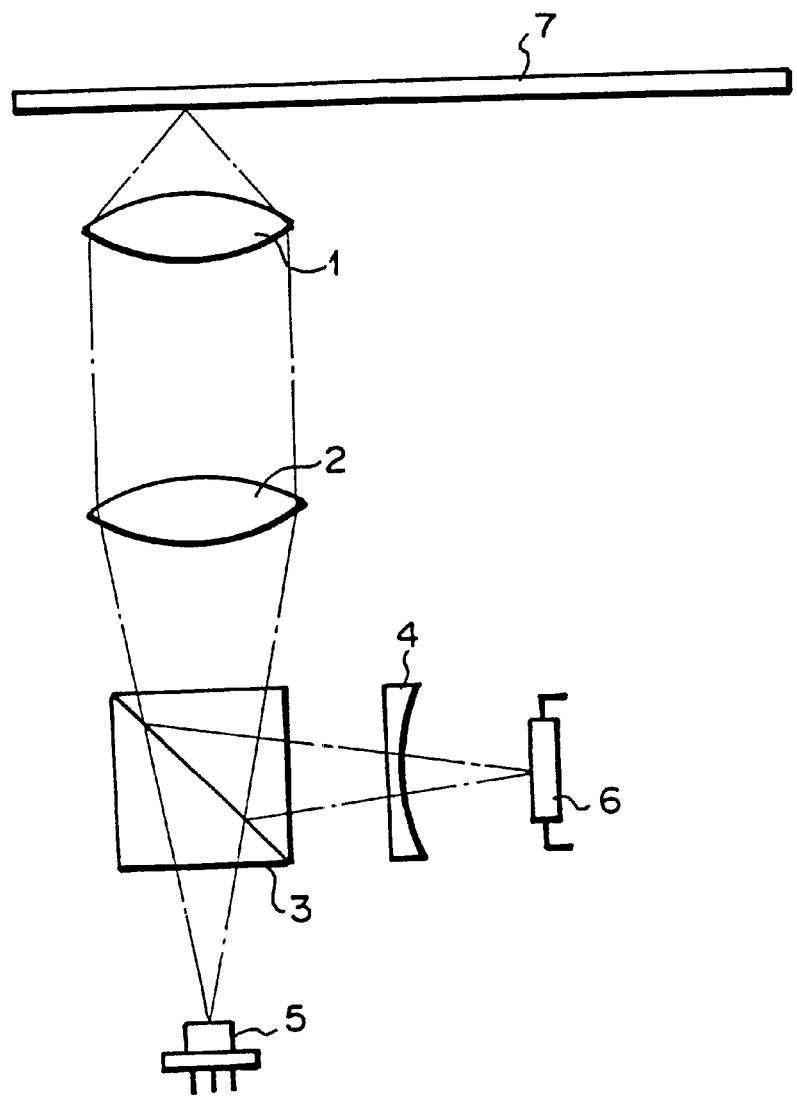
FIGS. 5A and 5B are diagrams partially showing the construction of an optical disc device.
Figure 5B:
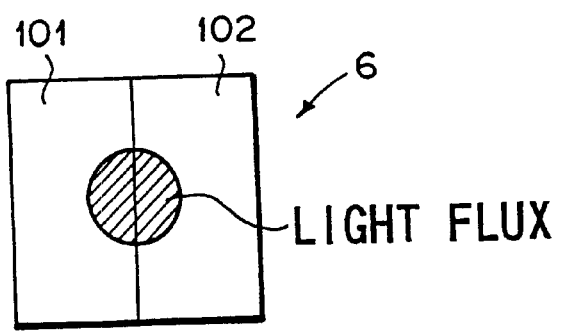

FIGS. 5A and 5B are diagrams partially showing the construction of an optical disc device.

As shown in FIG. 5A, light emitted from laser light source 5 is irradiated through beam splitter 3, collimating lens 2 and object lens 1 to optical disc 7. The light reflected from the optical disc 7 is passed through the object lens 1, the collimating lens 2, the beam splitter 3 and detection lens 4 and then irradiated to detector 6.

As shown in FIG. 5B, the detector 6 comprises the photodetectors 101 and 102, and performs tracking control and the like on the basis of the differential signal which is generated from the outputs of the photodetectors 101 and 102.

In the above embodiment, two photodetectors are used. However, if three or more photodetectors are used, the same effect can be obtained. For example, the differential output between the output of one photodetector and the output of another photodetector is obtained, and the bias voltage to the other photodetector is controlled on the basis of the differential output, whereby the photoelectric conversion efficiency can be matched (made coincident) between the photodetectors. The photodetector is not limited to an avalanche photodiode, and any element may be used even if the photoelectric conversion efficiency has large dispersion between elements.

As described above, according to the present invention, avalanche photodiodes or other elements which have been hitherto unusable for a differential signal detecting device because they have large dispersion in photoelectric conversion efficiency therebetween may be used to implement a differential signal detecting device having no dispersion in differential detection and having high photoelectric conversion efficiency.

What is claimed is:

1. An optical signal detector which comprises a first photodetector and a second photodetector, wherein each of said first and second photodetectors has a photoelectric conversion portion and means for applying a bias voltage to said photoelectric conversion portion, and the bias voltage to be applied to said second photodetector is controlled by a control means, a differential output means for taking the difference between the outputs of said first and said second photodetectors and outputting a differential signal, and said control means detects the difference in photoelectric conversion efficiency between said first and second photodetectors and varies the photoelectric conversion efficiency of said second photodetector in accordance with said difference in the photoelectric conversion efficiency.

2. The optical signal detecting device as claimed in claim 1, wherein said photoelectric conversion portion comprises an avalanche photodiode.

3. An optical signal detecting method for taking the difference between the outputs of a first photodetector and a second photodetector, wherein each of said first and second photodetectors includes a photoelectric conversion portion and means for applying a bias voltage to said photoelectric conversion portion, and outputting a differential signal, which comprises: detecting the difference in photoelectric conversion efficiency between said first and second photodetectors on the basis of the outputs of said first and second photodetectors, and controlling the bias voltage applied to said second photodetector to vary the photoelectric conversion efficiency of said second photodetector in accordance with said difference in the photoelectric conversion efficiency.

4. The optical signal detecting device as claimed in claim 3, wherein said photoelectric conversion portion comprises an avalanche photodiode.

* * * * *